US009449454B2

(12) United States Patent
Hornik

(10) Patent No.: US 9,449,454 B2
(45) Date of Patent: Sep. 20, 2016

(54) WAGERING GAME HAVING BONUS-AWARD FEATURE WITH CHANGING STATE

(75) Inventor: Jeremy M. Hornik, Chicago, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 900 days.

(21) Appl. No.: 12/513,227

(22) PCT Filed: Oct. 26, 2007

(86) PCT No.: PCT/US2007/022636
§ 371 (c)(1), (2), (4) Date: May 1, 2009

(87) PCT Pub. No.: WO2008/057247
PCT Pub. Date: May 15, 2008

(65) Prior Publication Data

US 2010/0062830 A1 Mar. 11, 2010

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***A63B 71/00*** | (2006.01) |
| ***A63F 1/18*** | (2006.01) |
| ***G07F 17/32*** | (2006.01) |
| ***G07F 17/34*** | (2006.01) |

(52) U.S. Cl.
CPC ........... *G07F 17/3211* (2013.01); *G07F 17/32* (2013.01); *G07F 17/3267* (2013.01); *G07F 17/34* (2013.01)

(58) Field of Classification Search
CPC .... G07F 17/32; G07F 17/34; G07F 17/3267; G07F 17/3211
USPC ............................ 463/16, 20, 25; 273/143 R
See application file for complete search history.

(56) References Cited

U.S. PATENT DOCUMENTS 4,306,768 A 12/1981 Egging ......................... 350/174
4,454,670 A 6/1984 Bachmann et al. .......... 194/350
4,517,558 A 5/1985 Davids .......................... 340/700
(Continued)

FOREIGN PATENT DOCUMENTS

EP 0521599 A1 1/1993 ............. G07F 17/32
JP 60-061079 4/1985 ............... B05D 1/28
(Continued)

OTHER PUBLICATIONS

"Bigfoot" Product Sheet, Shuffle Master, Inc., 1 page. (2000).
(Continued)

*Primary Examiner* — Omkar Deodhar
*Assistant Examiner* — Wei Lee
(74) *Attorney, Agent, or Firm* — Nixon Peabody LLP

(57) ABSTRACT

A gaming system for conducting a wagering game includes a display arrangement for displaying a video image overlaying a game display. The video image includes special symbols for indicating a bonus-award feature having a changing state. The changing state is continually updated or modified based on outcomes of the wagering game as displayed on the game display. The gaming system further includes a controller operative to cause the bonus-award feature to provide an award to the player in response to the state of the bonus-award feature meeting certain criteria.

30 Claims, 6 Drawing Sheets

(56) References Cited

U.S. PATENT DOCUMENTS

| | | | | |
|---|---|---|---|---|
| 4,562,433 | A | 12/1985 | Biferno | 340/716 |
| 4,568,928 | A | 2/1986 | Biferno | 340/716 |
| 4,718,672 | A | 1/1988 | Okada | 273/143 R |
| 5,393,061 | A | 2/1995 | Manship et al. | 273/143 R |
| 5,580,055 | A | 12/1996 | Hagiwara | 273/143 R |
| 5,697,843 | A | 12/1997 | Manship et al. | 463/20 |
| 5,722,891 | A | 3/1998 | Inoue | |
| 5,725,210 | A | 3/1998 | Yamaguchi et al. | 273/121 |
| 5,752,881 | A | 5/1998 | Inoue | 273/143 R |
| 5,810,665 | A | 9/1998 | Takemoto et al. | 463/31 |
| 5,890,962 | A | 4/1999 | Takemoto | 463/20 |
| 5,980,384 | A | 11/1999 | Barrie | 463/16 |
| 6,027,115 | A | 2/2000 | Griswold et al. | 273/143 R |
| 6,032,955 | A | 3/2000 | Luciano et al. | 273/138.1 |
| 6,036,188 | A | 3/2000 | Gomez et al. | 273/118 R |
| 6,038,188 | A | 3/2000 | Akamatsu | 365/226 |
| 6,056,642 | A | 5/2000 | Bennett | 463/20 |
| 6,086,066 | A | 7/2000 | Takeuchi et al. | 273/143 R |
| 6,089,977 | A | 7/2000 | Bennett | 463/20 |
| 6,095,921 | A | 8/2000 | Walker et al. | 463/20 |
| 6,135,884 | A | 10/2000 | Hedrick et al. | 463/20 |
| 6,135,885 | A | 10/2000 | Lermusiaux | 463/20 |
| 6,164,645 | A | 12/2000 | Weiss | 273/138.2 |
| 6,181,301 | B1 | 1/2001 | Inoguchi et al. | 345/5 |
| 6,193,606 | B1 | 2/2001 | Walker et al. | |
| 6,224,482 | B1 | 5/2001 | Bennett | 463/20 |
| 6,251,013 | B1 | 6/2001 | Bennett | 463/13 |
| 6,261,177 | B1 | 7/2001 | Bennett | 463/16 |
| 6,270,411 | B1 | 8/2001 | Gura et al. | 463/20 |
| 6,270,412 | B1 * | 8/2001 | Crawford et al. | 463/20 |
| 6,290,600 | B1 | 9/2001 | Glasson | 463/20 |
| 6,364,766 | B1 | 4/2002 | Anderson et al. | 463/16 |
| 6,368,216 | B1 | 4/2002 | Hedrick et al. | 463/20 |
| 6,375,568 | B1 | 4/2002 | Roffman et al. | 463/26 |
| 6,419,579 | B1 | 7/2002 | Bennett | 463/20 |
| 6,517,432 | B1 | 2/2003 | Jaffe | 463/16 |
| 6,517,433 | B2 | 2/2003 | Loose et al. | 463/20 |
| 6,645,073 | B2 * | 11/2003 | Lemay et al. | 463/20 |
| 6,682,073 | B2 * | 1/2004 | Bryant et al. | 273/138.1 |
| 6,802,073 | B1 | 10/2004 | Takahashi et al. | |
| 6,817,946 | B2 | 11/2004 | Motegi et al. | 463/31 |
| 6,887,154 | B1 | 5/2005 | Luciano et al. | 463/26 |
| 6,937,298 | B2 | 8/2005 | Okada | 349/58 |
| 7,048,275 | B2 * | 5/2006 | Adams | 273/292 |
| 7,097,560 | B2 | 8/2006 | Okada | 463/20 |
| 7,140,963 | B2 | 11/2006 | Kojima | 463/20 |
| 7,159,865 | B2 | 1/2007 | Okada | 273/143 |
| 7,160,187 | B2 | 1/2007 | Loose et al. | 463/20 |
| 7,166,029 | B2 | 1/2007 | Enzminger | 463/20 |
| 7,192,345 | B2 | 3/2007 | Muir et al. | |
| 7,204,753 | B2 | 4/2007 | Ozaki et al. | 463/16 |
| 7,255,643 | B2 | 8/2007 | Ozaki et al. | 463/20 |
| 7,255,644 | B2 | 8/2007 | Duhamel | 463/25 |
| 7,798,895 | B2 | 9/2010 | Jubinville et al. | 463/18 |
| 7,874,915 | B2 | 1/2011 | Caspers et al. | 463/27 |
| 7,905,778 | B2 | 3/2011 | Breckner et al. | 463/26 |
| 2001/0031658 | A1 | 10/2001 | Ozaki et al. | 463/16 |
| 2002/0175464 | A1 * | 11/2002 | Bryant et al. | 273/138.1 |
| 2002/0175466 | A1 | 11/2002 | Loose et al. | 273/143 |
| 2003/0027622 | A1 * | 2/2003 | Osawa | 463/20 |
| 2003/0054872 | A1 * | 3/2003 | Locke et al. | 463/20 |
| 2003/0060269 | A1 | 3/2003 | Paulsen et al. | 463/20 |
| 2003/0087690 | A1 | 5/2003 | Loose et al. | 463/20 |
| 2003/0157980 | A1 | 8/2003 | Loose et al. | 463/20 |
| 2003/0234489 | A1 | 12/2003 | Okada | 273/236 |
| 2003/0236118 | A1 | 12/2003 | Okada | 463/20 |
| 2004/0014520 | A1 | 1/2004 | Okada | 463/20 |
| 2004/0029636 | A1 | 2/2004 | Wells | 463/32 |
| 2004/0063490 | A1 | 4/2004 | Okada | 463/20 |
| 2004/0116178 | A1 | 6/2004 | Okada | 463/20 |
| 2004/0147303 | A1 | 7/2004 | Imura et al. | 463/16 |
| 2004/0150162 | A1 | 8/2004 | Okada | 273/292 |
| 2004/0152502 | A1 | 8/2004 | Okada | 463/16 |
| 2004/0166925 | A1 | 8/2004 | Emori et al. | 463/20 |
| 2004/0166926 | A1 | 8/2004 | Adachi et al. | 463/20 |
| 2004/0171418 | A1 | 9/2004 | Okada | 463/20 |
| 2004/0176156 | A1 * | 9/2004 | Walker | G07F 17/32 463/16 |
| 2004/0198485 | A1 * | 10/2004 | Loose et al. | 463/20 |
| 2004/0207154 | A1 | 10/2004 | Okada | 273/138.1 |
| 2004/0209666 | A1 | 10/2004 | Tashiro et al. | 463/20 |
| 2004/0209667 | A1 | 10/2004 | Emori et al. | 463/20 |
| 2004/0209668 | A1 | 10/2004 | Okada | 463/20 |
| 2004/0209670 | A1 | 10/2004 | Adachi et al. | 463/20 |
| 2004/0209671 | A1 | 10/2004 | Okada | 463/20 |
| 2004/0209672 | A1 | 10/2004 | Okada | 463/20 |
| 2004/0209678 | A1 | 10/2004 | Okada | 463/30 |
| 2004/0209681 | A1 | 10/2004 | Emori et al. | 463/31 |
| 2004/0209682 | A1 | 10/2004 | Okada | 463/31 |
| 2004/0214635 | A1 | 10/2004 | Okada | 463/30 |
| 2004/0214637 | A1 | 10/2004 | Nonaka | 463/31 |
| 2004/0219965 | A1 | 11/2004 | Okada | 463/16 |
| 2004/0224747 | A1 | 11/2004 | Okada | 463/16 |
| 2004/0224758 | A1 | 11/2004 | Okada et al. | 463/31 |
| 2004/0227286 | A1 | 11/2004 | Tanimura et al. | 273/143 |
| 2004/0227866 | A1 | 11/2004 | Okada | 349/58 |
| 2004/0229680 | A1 | 11/2004 | Hoshino et al. | 463/20 |
| 2004/0229686 | A1 | 11/2004 | Tanimura et al. | 463/30 |
| 2004/0266510 | A1 | 12/2004 | Kojima | 463/16 |
| 2004/0266515 | A1 | 12/2004 | Gauselmann | 463/20 |
| 2004/0266521 | A1 | 12/2004 | Kojima | 463/20 |
| 2005/0026669 | A1 * | 2/2005 | Nelson et al. | 463/16 |
| 2005/0032571 | A1 | 2/2005 | Asonuma | 463/20 |
| 2005/0130732 | A1 | 6/2005 | Rothschild et al. | |
| 2005/0140088 | A1 | 6/2005 | Randall | 273/143 |
| 2005/0153775 | A1 | 7/2005 | Griswold et al. | |
| 2005/0187003 | A1 | 8/2005 | Adachi et al. | 463/16 |
| 2005/0192090 | A1 | 9/2005 | Muir et al. | 463/30 |
| 2005/0255908 | A1 | 11/2005 | Wells | 463/20 |
| 2005/0272500 | A1 | 12/2005 | Tanimura et al. | 463/20 |
| 2005/0282616 | A1 | 12/2005 | Tanimura et al. | 463/20 |
| 2005/0282617 | A1 | 12/2005 | Sekiguchi et al. | 463/20 |
| 2006/0014580 | A1 | 1/2006 | Hawthorn | 463/20 |
| 2006/0128467 | A1 | 6/2006 | Thomas | |
| 2006/0135248 | A1 | 6/2006 | Anderson et al. | 463/22 |
| 2006/0252496 | A1 | 11/2006 | Rasmussen | 463/20 |
| 2006/0281530 | A1 | 12/2006 | Seelig et al. | 463/20 |
| 2007/0004513 | A1 | 1/2007 | Wells et al. | 463/31 |
| 2007/0054730 | A1 | 3/2007 | Mattice et al. | 463/16 |
| 2007/0149281 | A1 | 6/2007 | Gadda et al. | 463/34 |
| 2009/0247277 | A1 | 10/2009 | Caspers et al. | 463/20 |

FOREIGN PATENT DOCUMENTS

| | | | |
|---|---|---|---|
| JP | 61-279272 | 12/1986 | A63F 7/02 |
| JP | 02-019182 | 1/1990 | A63F 7/02 |
| JP | 04-109977 | 4/1992 | A63F 5/04 |
| JP | A-H04-114676 | 4/1992 | A63F 5/04 |
| JP | A-H04-341288 | 11/1992 | A63F 7/02 |
| JP | 05-177043 | 7/1993 | A63F 7/02 |
| JP | 06-039085 | 2/1994 | A63F 5/04 |
| JP | 07-016340 | 1/1995 | A63F 7/02 |
| JP | 07-124290 | 5/1995 | A63F 5/04 |
| JP | 072 99189 A | 11/1995 | |
| JP | 08-103541 | 4/1996 | A63F 7/02 |
| JP | 2531253 | 1/1997 | A47F 11/06 |
| JP | 9-207625 | 8/1997 | B60K 35/00 |
| JP | 10-071228 | 3/1998 | A63F 5/04 |
| JP | 10-091076 | 4/1998 | G09F 9/00 |
| JP | 10-305130 | 11/1998 | A63F 5/04 |
| JP | 10-328398 | 12/1998 | G07F 9/10 |
| JP | 11-090017 | 4/1999 | A63F 7/02 |
| JP | 11-099240 | 4/1999 | A63F 5/04 |
| JP | 11-137774 | 5/1999 | A63F 5/04 |
| JP | 11-152970 | 6/1999 | E06B 9/02 |
| JP | 11-153970 | 6/1999 | G09F 9/33 |
| JP | 11-244451 | 9/1999 | G63F 5/04 |
| JP | 2000-51314 | 2/2000 | A63F 5/04 |
| JP | 2000-65097 | 3/2000 | A63F 5/04 |
| JP | 2000-68925 | 3/2000 | A63F 5/04 |
| JP | 2000-262738 | 9/2000 | A63F 13/00 |
| JP | 2000-350805 | 12/2000 | |
| JP | 2001-062032 | 3/2001 | |

(56) References Cited

FOREIGN PATENT DOCUMENTS

| | | | |
|---|---|---|---|
| JP | 2001-238995 | 9/2001 | |
| JP | 2002-113150 | 4/2002 | ............... A63F 5/04 |
| WO | WO 2006/036948 A2 | 4/2006 | |

OTHER PUBLICATIONS

"Big Games Safari" Product Sheet, IGT, 24 pages. (2000).
"Cabby Cash™" Product Sheet, Anchor Gaming, 2 pages. (2000).
"Congo Quest™" Product Sheet, Anchor Gaming, 2 pages. (2000).
"Fishin' Buddies™" Product Sheet, Anchor Gaming, 2 pages. (2000).
Legato, Frank, "The Full Monty," Strictly Slots, pp. 48-50 (Jun. 1999).
"Gooooal!" Product Sheet, Bally Gaming, Inc., 2 pages. (2000).
"Great Whites" Product Sheet, VLC, Inc., 2 pages. (2000).
"Jackpot Stampede Deluxe™" Product Sheet, WMS Gaming Inc., 2 pages. (1997).
"Loaded Dice" Product Sheet, Konami Gaming, 2 pages. (2000).
"Neptune's Pearls" Product Sheet, Unidesa Gaming, 4 pages. (1998).
"Penguin Pays" Product Sheet, Aristocrat Incorporated, 2 pages. (1998).
"Stroke of Luck™" Product Sheet, WMS Gaming Inc., 2 pages. (1997).
"Wild Cougar" Article, Strictly Slots, p. 44 (Feb. 1999).
"Yahtzee® Brand Video Game" Product Brochure, Hasbro, Inc., 2 pages (2000).
Decision of Refusal of Aug. 30, 2005, issued from Japanese Patent Office for the corresponding Japanese application No. 2000-051314.
Written Opinion corresponding to co-pending International Patent Application Serial No. PCT/US2007/022636, European Patent Office; dated Jul. 23, 2008; 4 pages.
International Search Report corresponding to co-pending International Patent Application Serial No. PCT/US2007/022636, European Patent Office; dated Jul. 23, 2008; 2 pages.

* cited by examiner

WAGERING GAME HAVING BONUS-AWARD FEATURE WITH CHANGING STATE

CROSS-REFERENCE TO RELATED APPLICATIONS

This application is a U.S. National Stage of International Application No. PCT/US2007/022636, filed Oct. 26, 2007, which claims the benefit of U.S. Provisional Application No. 60/856,077, filed on Nov. 2, 2006, both of which are incorporated by reference herein in their entireties.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to wagering games having a bonus-award feature for awarding a prize to a player at the gaming machine. The bonus-award feature includes assets indicating a state of the bonus-award feature that is modifiable based on outcomes of the wagering game.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a “secondary” or “bonus” game that may be played in conjunction with a “base” game. The bonus game may comprise any type of game, either similar to or completely different from the base game, which is entered upon the occurrence of a selected event or outcome in the base game. Generally, bonus games provide a greater expectation of winning than the base game and may also be accompanied with more attractive or unusual video displays and/or audio. Bonus games may additionally award players with “progressive jackpot” awards that are funded, at least in part, by a percentage of coin-in from the gaming machine or a plurality of participating gaming machines.

Another way to increase the entertainment value of a game is to enhance the display of the gaming machines. For gaming machines with video displays, improvements in video technology have enabled the display of richer and more colorful graphics. For gaming machines with mechanical displays, however, the enhancements early on were less technologically advanced. For example, some mechanical reel symbols were colored by backlighting the mechanical symbols with colored lighting elements. Sometimes the reel itself might contain electroluminescent elements that defined one or more reel symbols. To display a symbol in multiple colors or formats using such an arrangement, multiple electroluminescent elements were needed for the symbol.

Recent advances in transmissive display technology have made it possible to more easily modify the appearance of mechanical displays. A transmissive display is essentially a transparent video display that is superimposed over the mechanical display. The transmissive display may then be operated to display selected video images over the mechanical display. These video images may include translucent portions such that the underlying mechanical display is visible, but in an altered state (i.e., different color, texture, etc.). The video images may also include opaque portions so as to completely block out parts of the underlying mechanical display. For information regarding the use of transmissive display technology in gaming machines and for embodiments employing transmissive displays, the reader is referred to commonly-assigned U.S. Published Application No. 20040198485, titled “Gaming Machine with Superimposed Display Image,” filed on Nov. 7, 2003, and also to commonly-assigned U.S. Pat. No. 6,517,433, titled “Reel Spinning slot Machine With Superimposed Video Image,” issued on Feb. 11, 2003, each of which being incorporated herein by reference in its entirety.

The above-described transmissive display technology gives wagering game designers the capability and flexibility to more easily design and modify the appearance of mechanical displays. Accordingly, there is a need to develop new and improved wagering games for mechanical displays using this technology, with features that take full advantage of the capabilities of the transmissive display to thereby enhance the entertainment value of the wagering games.

SUMMARY OF THE INVENTION

According to one aspect of the present invention, a gaming system for playing a wagering game comprises a game display operable to display symbols indicating a randomly selected outcome of a wagering game in response to receiving a wager from a player. The gaming system also comprises a display arrangement for displaying a video image overlaying the game display. The video image includes special symbols indicating a state of a bonus-award feature. The state of the bonus-award feature is continually updated based on outcomes in the wagering game. The bonus-award feature provides an award to the player in response to the state meeting certain criteria. The gaming system further comprises a controller that is operative to cause the bonus-award feature to provide the award to the player in response to the state meeting the certain criteria.

According to another aspect of the invention, a method of conducting a wagering game on a gaming system comprises the acts of receiving a wager input from a player for playing the wagering game and displaying a plurality of symbols on a game display. The symbols indicate a randomly selected outcome of a plurality of outcomes. The method also comprises the acts of overlaying a video image over the game display and displaying a bonus-award feature on the video image that includes a plurality of assets that indicate a state of the bonus-award feature. The method further comprises the acts of changing the state of the bonus-award feature based on the outcome of the wagering game and awarding an award based on the state of the bonus-award feature meeting certain criteria.

According to yet another aspect of the invention, a computer readable storage medium is encoded with instructions for directing a gaming system to perform the above method.

According to a further aspect of the invention, a gaming system for conducting a wagering game comprises a mechanical reel display having a plurality of reels and indicating, via a plurality of reel symbols, a randomly selected outcome of the wagering game. The gaming system also comprises a display arrangement for displaying a video image overlaying the mechanical reel display. The video image displays an award feature having a plurality of assets. The award feature is capable of being modified by the randomly selected outcome indicated by the mechanical reel display. The gaming system further comprises a controller programmable to display a first state of the award feature, modify the first state of the award feature to indicate a second state of the award feature, and provide an award based on the modification of the award feature.

Additional aspects of the invention will be apparent to those of ordinary skill in the art in view of the detailed description of various embodiments, which is made with reference to the drawings, a brief description of which is provided below.

DETAILED DESCRIPTION

Figure 1:
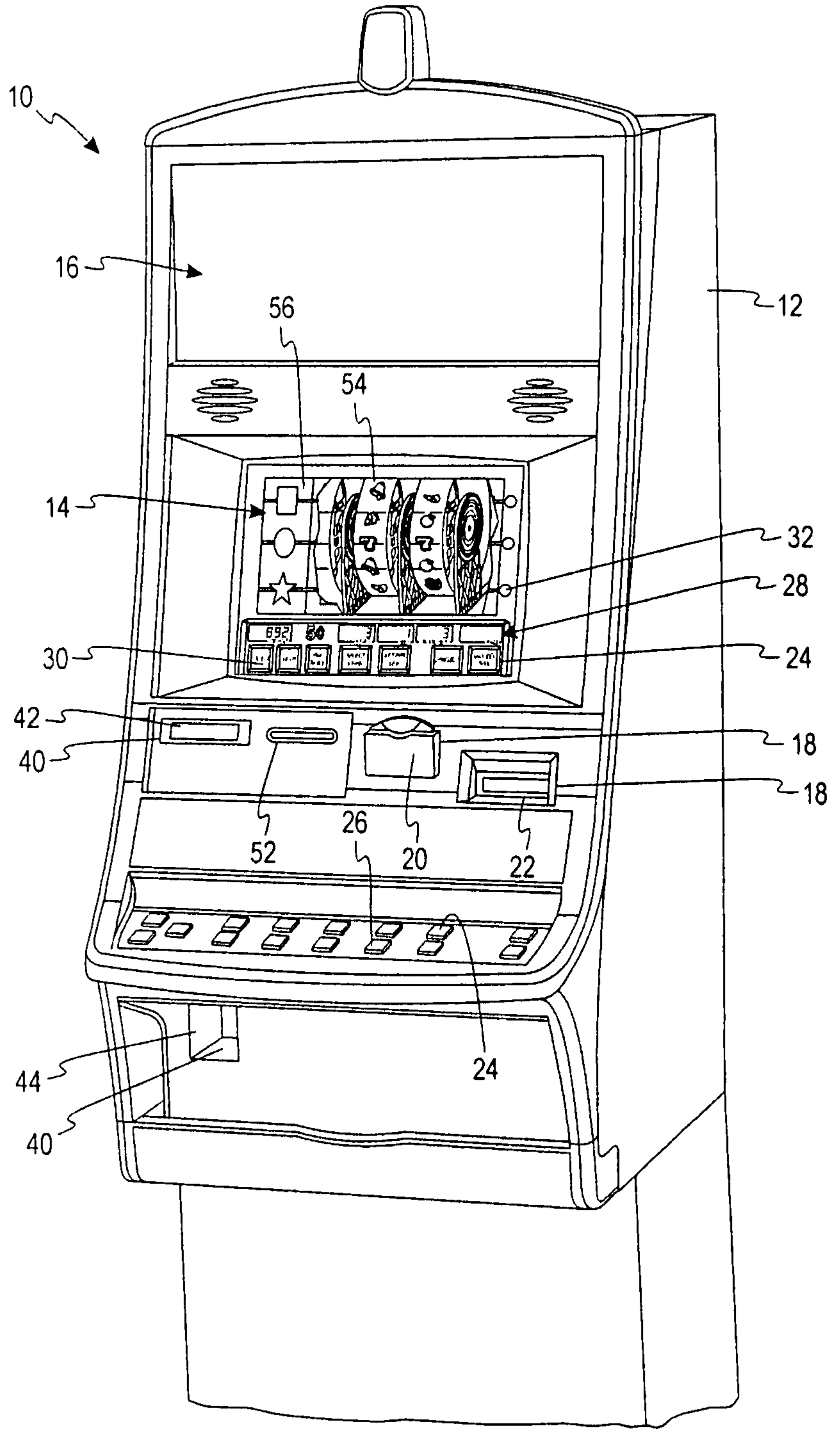
FIG. 1 is a perspective view of a free standing gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, a mechanical reel gaming machine 10 similar to those used in gaming establishments, such as casinos, is shown. The gaming machine 10 comprises a housing 12 and a number of input devices, including a value input device 18 and a player input device 24. For outputs, the gaming machine 10 comprises a primary display area 14 for displaying information about base wagering games and a secondary display area 16 for displaying game events, game outcomes, and/or signage information. The primary display area 14 and/or secondary display area 16 may also display information about bonus wagering games and progressive wagering games. In accordance with embodiments of the invention, the primary display area 14 comprises a plurality of mechanical reels 54 and a transmissive display 56 superimposed over the mechanical reels 54. Each of the foregoing components is described in more detail below. While the exemplary embodiments described below refer to the mechanical reels 54, in other embodiments the mechanical reels 54 can be replaced with video reels 54' (see FIG. 3). Thus, alternatively, the primary display area 14 can include the transmissive display 56 being superimposed over a plurality of video reels 54'.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency. Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like on the primary display area 14 over the transmissive display 56 and/or on the secondary display area 16. The touch screen 28 contains soft touch keys 30 denoted by graphics on the underlying primary display area 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

A player begins play of the base wagering game by making a wager via the value input device 18 of the gaming machine 10. A player can select play by using the player input device 24, via the buttons 26 or the touch screen keys 30. The base game consists of a plurality of symbols arranged in an array, and includes at least one payline 32 that indicates one or more outcomes of the base game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1 as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display area 16 or other dedicated player-tracking display for providing the player with information about his or her account or other player-specific information. Also, in some embodiments, the information reader 52 may be used to restore game assets that the player achieved and saved during a previous game session.

In the illustrated embodiment, the gaming machine 10 is an "upright" version in which the primary display area 14 is oriented vertically relative to the player. Alternatively, the gaming machine may be a "slant-top" version in which the primary display area 14 is slanted at about a thirty-degree angle toward the player of the gaming machine 10. Furthermore, although only three mechanical reels are shown in the primary display area 14, those having ordinary skill in the art will recognize that the gaming machine 10 may comprise fewer or more mechanical reels (e.g., four reels, five reels, etc.), depending on the particular configuration of the primary display area 14.

Figure 2A:
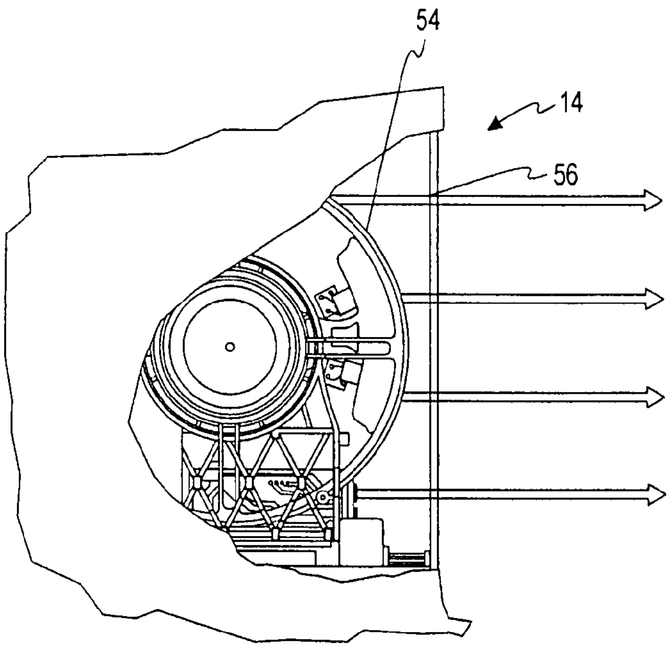
FIGS. 2*a*-2*b* are cross-sectional side views of a display area embodying the present invention.
Figure 2B:
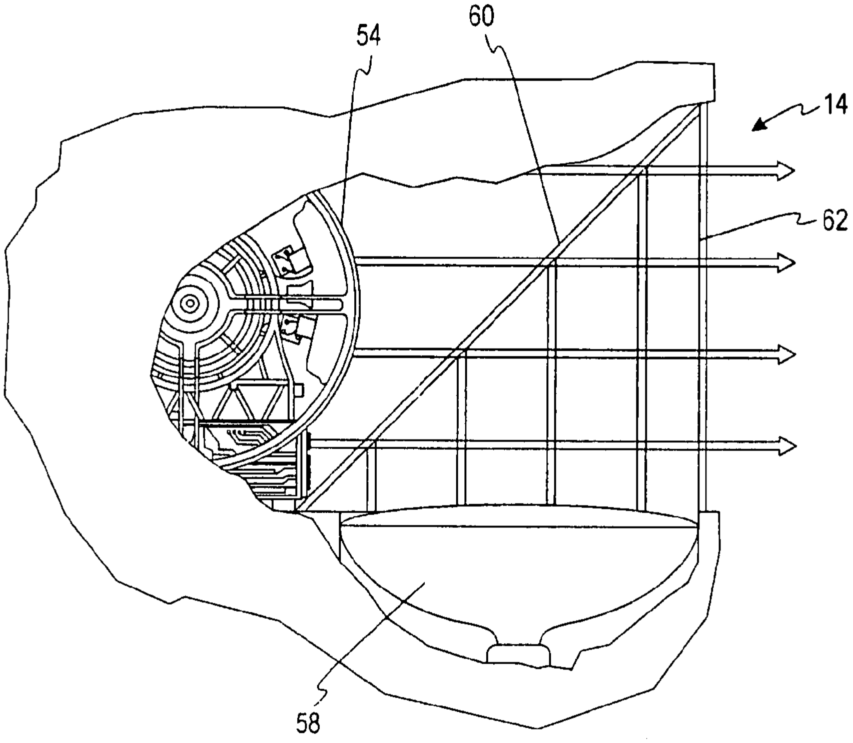

FIGS. 2*a*-2*b* illustrate exemplary implementations of the primary display area 14 in which a video image is superimposed over the mechanical reels 54. Although not expressly labeled, each reel of the mechanical reels 54 has a plurality of reel symbols (see FIG. 1) that represent a randomly-selected outcome of the wagering game. The video image may then be positioned over the mechanical reels 54 to enhance and/or alter the appearance (e.g., color, texture, etc.) of the mechanical reels 54. There are at least two possible configurations for the primary display area 14: a direct image configuration (FIG. 2*a*), and a virtual image configuration (FIG. 2*b*). These configurations are described below.

Referring to FIG. 2*a*, in the direct image configuration, a transmissive display 56 is positioned directly in front of the mechanical reels 54 and generates a direct image. In such an arrangement, the transmissive display 56 may be a flat panel transmissive video display, for example, a transmissive liquid crystal display (LCD) commercially available from LG Phillips LCD Co., Ltd., of Seoul, Korea, Sharp Electronics Corp. of Tokyo, Japan, and other display manufacturers. The flat panel transmissive video display is preferably preconfigured with the touch screen 28 (see FIG. 1) mounted to a front surface of the display.

In the virtual image configuration, shown in FIG. 2*b*, a reflected video image is used instead of a direct image. In such an arrangement, the reflected video image may be generated by, for example, a standard video display 58 and a partially reflective mirror 60. The standard video display 58 may be mounted below the mechanical reels 54 and substantially normal thereto, and the partially reflective mirror 60 may be positioned over the mechanical reels 54 at a predetermined angle (e.g., 45 degrees). Video images from the standard video display 58 are then reflected off the partially reflective mirror 60 so that they appear to a player to be superimposed over the mechanical reels 54. The standard video display 58 may be any suitable video projection display known to those having ordinary skill in the art, including a CRT, LCD, dot matrix, LED, electro luminescent, and the like. In some embodiments, the primary display area 14 further comprises a transparent glass cover/window 62 positioned over the partially reflective mirror 60 to protect the mirror 60. Such a cover/window 62 may be optionally configured with the touch screen 28 for receiving player input.

The superimposed video images may be selectively made transparent, semi-transparent (i.e., translucent), or opaque in selected places. This allows preselected images to be displayed over certain portions of the primary display area 14, with the result that certain areas of the primary display area 14 are either altered in some way (e.g., highlighted, colored, etc.), or completely blocked by the superimposed images. All video images superimposed on the primary display area 14 may be rendered in two-dimensional (e.g., using Flash Macromedia™) or three-dimensional graphics (e.g., using Renderware™) The images may be played back (e.g., from a recording stored on the gaming machine 10), streamed (e.g., from the gaming network), or received as a TV signal (e.g., either broadcast or via cable). The images may be animated, or they may be real-life images, either prerecorded (e.g., in the case of marketing/promotional material) or as live footage, and the format of the video images may be an analog format, a standard digital format, or a high-definition (HD) digital format. Using superimposed video images in this way allows numerous types of improvements and enhancements to be made to the appearance of the primary display area 14 in real time and during on-going game play.

Figure 3:
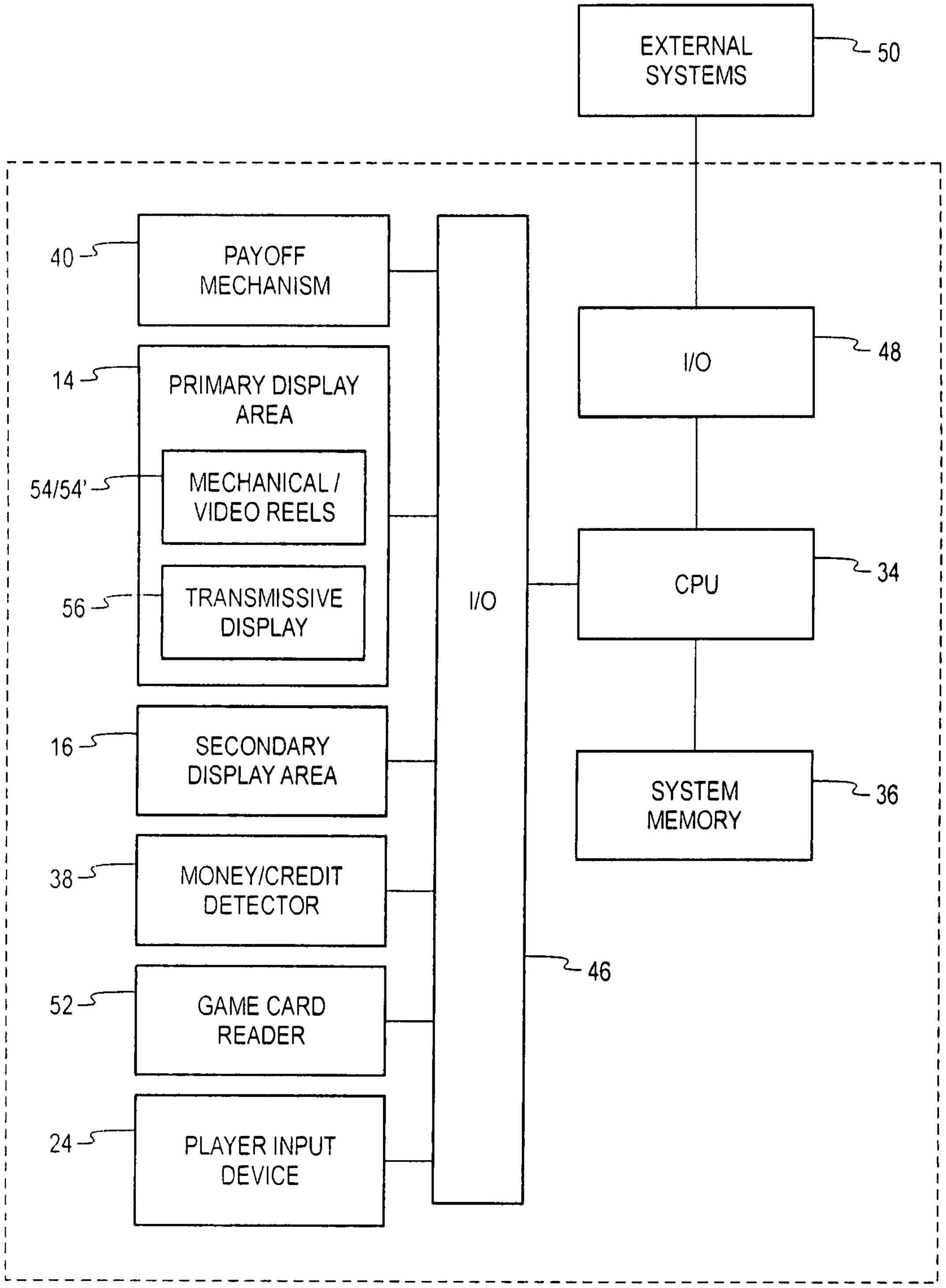
FIG. 3 is a block diagram of a control system suitable for operating the gaming machine of FIG. 1.

Turning now to FIG. 3, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10, but may be located outboard of the housing 12 and connected to the remainder of the components of the gaming machine 10 via a variety of different wired or wireless connection methods.

As seen in FIG. 3, the controller 34 is also connected to, and controls, the primary display area 14, the player input device 24, and a payoff mechanism 40. The primary display area 14 in this embodiment uses the transmissive display 56 to superimpose a video image over the mechanical/video reels 54/54', but a reflected image arrangement (see FIG. 2*b*) may also be used in other embodiments. The payoff mechanism 40 is operable in response to instructions from the controller 34 to award a payoff to the player in response to certain winning outcomes that might occur in the base game or the bonus game(s). The payoff may be provided in the form of points, bills, tickets, coupons, cards, and the like. For example, in FIG. 1, the payoff mechanism 40 includes both a ticket printer 42 and a coin outlet 44. However, any of a variety of payoff mechanisms 40 well known in the art may be implemented, including cards, coins, tickets, smart-cards, cash, and the like. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10 bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 3, the controller 34 in the gaming machine 10 is depicted as comprising a CPU, but the controller 34 may alternatively comprise a CPU in combination with other components, such as the I/O circuits 46, 48 and the system memory 36. The controller 34 may reside partially or entirely inside or outside of the machine 10.

By virtue of the superimposed video images, a variety of traditional as well as visually-enhanced wagering games involving the mechanical reels 54 may be played on the gaming machine 10. These wagering games may be provided to the gaming machine 10 using any suitable means known to those having ordinary skill in the art, including hardware upgrades as well as direct downloads via external systems 50. In the latter case, external systems 50 (in a wired or wireless manner) such that each machine operates as a "thin client," having relatively less functionality, a "thick client," having relatively more functionality, or through any range of functionality therebetween (e.g., a "rich client"). As a generally "thin client," the gaming machine may operate primarily as a display device to display the results of gaming outcomes processed externally, for example, on a server as part of the external systems 50. In this "thin client" configuration, the server executes game code and determines game outcomes (e.g., with a random number generator), while the controller 34 on board the gaming machine processes display information to be displayed on the display(s) of the machine. In an alternative "rich client" configuration, the server determines game outcomes, while the controller 34 on board the gaming machine executes game code and processes display information to be displayed on the display(s) of the machines. Numerous alternative configurations are possible such that the aforementioned and other functions may be performed onboard or external to the gaming machine 10 as may be necessary for particular applications.

Thus far, embodiments of the invention have only been described as video images being superimposed on the primary display area 14. It is also possible, however, to superimpose the video images on the secondary display area 16 as well without departing from the scope of the invention. Still, in most embodiments, the primary display area 14 is the one with the video images superimposed thereon. The reason for this is because in most gaming machines 10, the primary display area 14 is as the one that includes the mechanical reels (e.g., for a slot machine), a mechanical wheel (e.g., a roulette game), one or more dice, a pachinko board, or other board game. In alternative embodiments, however, the primary display area 14 may include video reels 54' by using a video display such as a CRT or LCD. Video images may then be superimposed on the video reels 54' as needed. In further alternative embodiments, the primary display area 14 may include a diorama presenting a three-dimensional model of a game environment. The diorama may be stationary in some implementations, or it may slide or move around in one or more dimensions.

Figure 4:
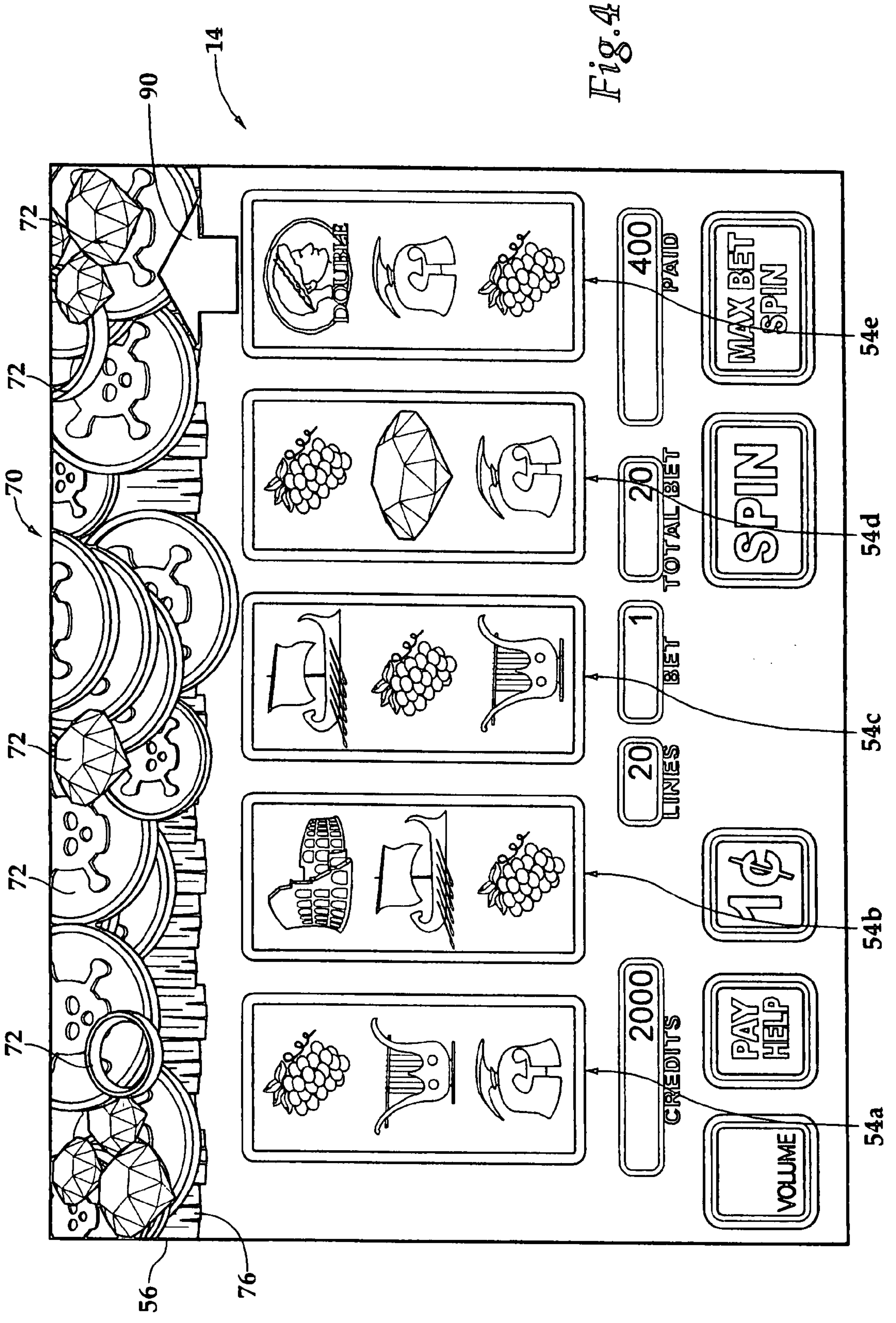
FIG. 4 is a perspective view of a display of the gaming machine of FIG. 1 illustrating a bonus-award feature according to one embodiment of the present invention.
Figure 5:
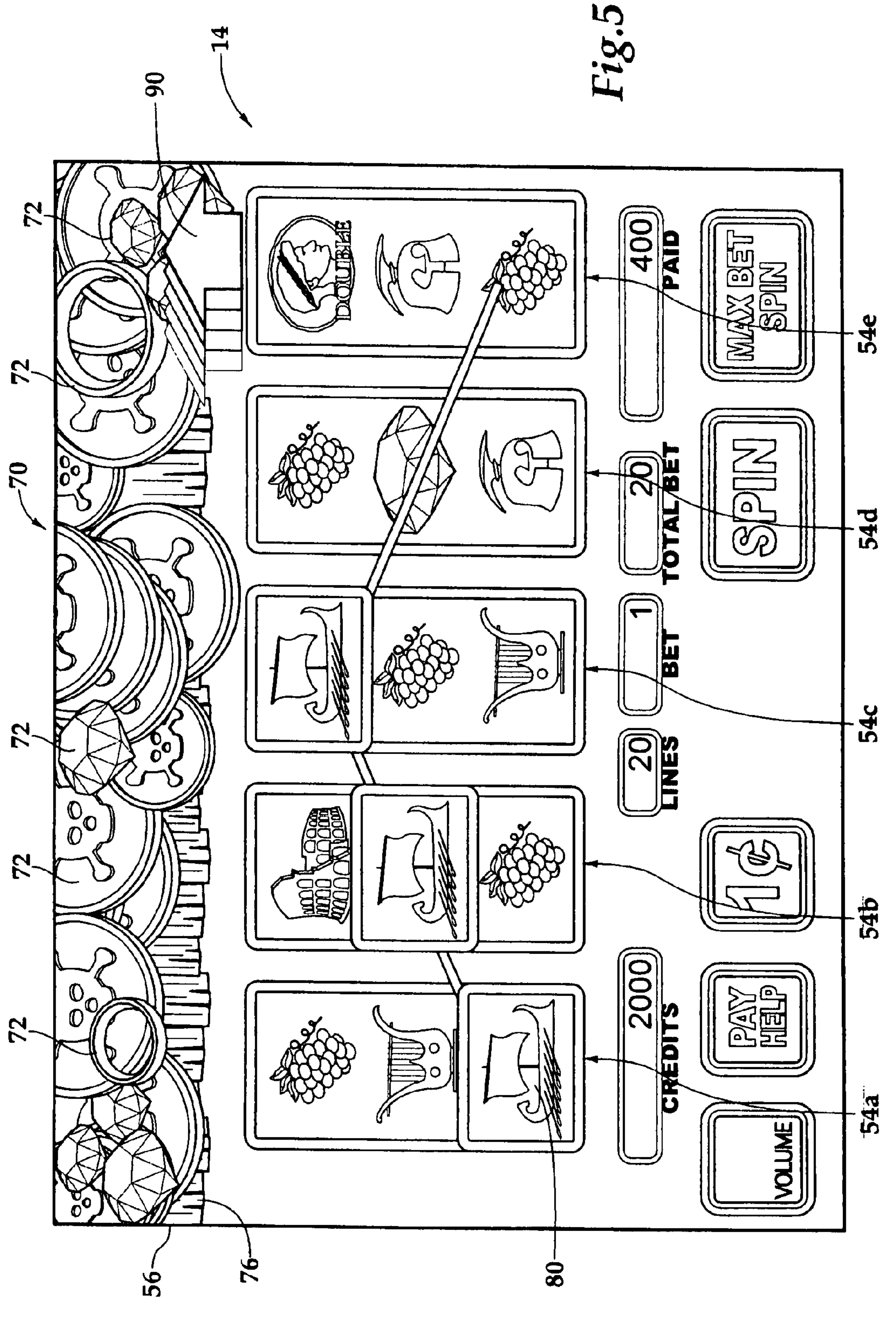
FIG. 5 is a perspective view of a display illustrating the changing state of the bonus-award feature based on an outcome of the base wagering game according to another embodiment of the present invention.
Figure 6:
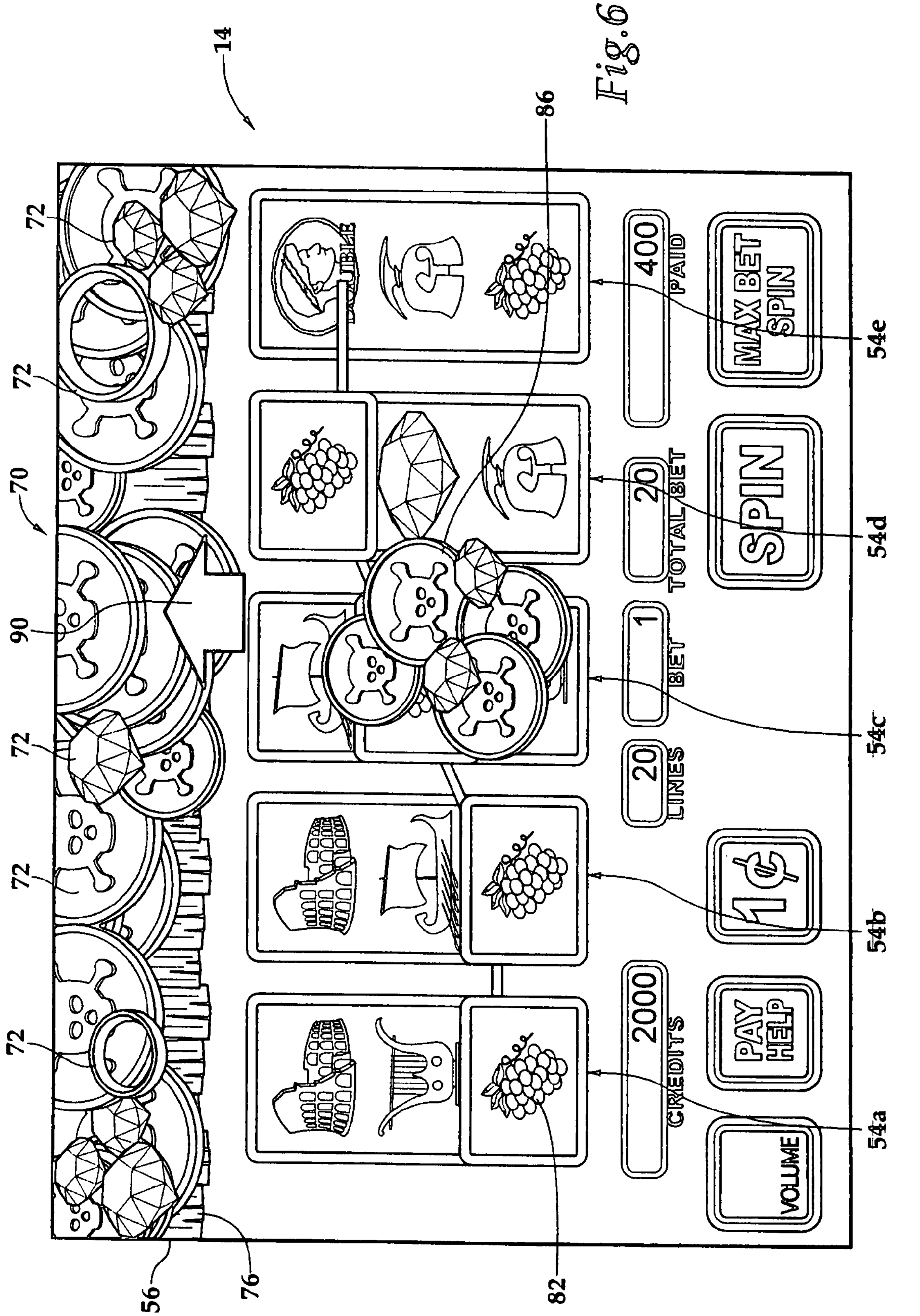
FIG. 6 is a perspective view of a display illustrating the bonus-award feature awarding a prize to a player according to a further embodiment of the present invention.

Turning now to FIG. 4, a primary display area 14 is shown having a plurality of symbols for indicating a randomly selected outcome of a wagering game. A transmissive display 56 overlays the primary display area 14, which, as shown, includes a plurality of mechanical reels 54*a-e*. Thus, the primary display area 14 may include the mechanical reels 54*a-e* and the transmissive display 56. As discussed above, the transmissive display 56 allows video images to be displayed via a display arrangement over certain portions of the primary display area 14. Thus, the player sees the primary display area 14, which can be altered in some way by the images on the transmissive display 56. For example, as shown in FIGS. 4-6, one type of alteration includes displaying a bonus game over portions of the base wagering game displayed on the primary display area 14. The bonus game may be displayed concurrently on the transmissive display 56 while the base wagering game is being played on the mechanical reels 54*a-e*. Alternatively, in some embodiments, the bonus game may not be displayed on the transmissive display 56 until after the base wagering game ends and a bonus round begins. At the end of the bonus round, the bonus game may be removed from the transmissive display 56 and play of the base wagering game resumes on the primary display area 14. In this case, at certain times, the primary display area 14 may include only the mechanical reels 54*a-e*.

In the embodiment shown in FIG. 4, the transmissive display 56 provides a display arrangement which is adapted to display video images of assets, such as coins, diamonds, rings and other objects, relating to a bonus-award feature 70. The bonus-award feature 70 is displayed on the transmissive display 56 in a certain state that is continually updated based on outcomes of the wagering game displayed on the mechanical reels 54*a-e*. As mentioned above, the state of the bonus-award feature 70 is displayed as special symbols, which may include assets 72 such as coins, jewels, rings, wild symbols and other assets that are associated with value.

In one embodiment, the special symbols may indicate a state of the bonus-award feature 70 which includes assets 72 resting on a shelf or ledge 76. A portion of the assets 72 are placed near the edge of the shelf or ledge 76 and hover over the edge of the shelf or ledge 76 such that it appears that the assets 72 may fall off of the shelf or ledge 76 and onto a portion of the primary display area 14. As shown in FIG. 4, the primary display area 14 may include a plurality of mechanical reels 54*a-e*, although video reels may be used as well. Alternatively or additionally, the primary display area 14 may include other items such as a board game, mechanical wheels, one or more dice, pachinko board, and the like.

According to one embodiment, the randomly selected outcome as shown on the reels 54*a-e* affects the state of the bonus-award feature 70. For example, as shown in FIGS. 5 and 6, each time a special symbol 80 (FIG. 5) appears on one or more of the reels 54*a-e* and/or a winning combination 82 (FIG. 6) occurs, additional assets 72 may be added to the bonus-award feature 70 and may change the state of the bonus-award feature 70. The addition of assets 72 to the bonus-award feature 70 may occur by "transferring" one or more assets 72 from the reels 54*a-e* to the transmissive display 56. For example, one or more coin symbols from reels 54*a-e* may be added to the stack of coin symbols on the shelf or ledge 76. Alternatively or additionally, one or more assets 72 may be added to the bonus-award feature 70 via other game features on the primary display area 14, such as board games, mechanical wheels, one or more dice and other such features.

As game play continues, once certain game-play criteria is met, the state of the bonus-award feature 70 may be modified such that assets 72 may "move" from one position on the transmissive display 56 to another position on the transmissive display 56. For example, the transmissive display 56 may display the assets 72 moving from one position on the shelf or ledge 76 towards the edge of the shelf or ledge 76 and then teetering off of the shelf or ledge 76. Thus, the state of the bonus-award feature 70 continues to change and/or is updated due to the movement of the assets 72 on the transmissive display 56.

In some embodiments, based upon the changing state of the bonus-award feature 70, the assets 72 may be transferred to different locations on the primary display area 14. For example, the assets 72 may be transferred so that it appears that the assets 72 have fallen off of the shelf or ledge 76 and onto the reels 54*a-e* on the primary display area 14. Alternatively, the assets 72 may be transferred to different portions of the primary display area 14 other than the reels 54*a-e*. The moving assets 86, indicating the change of the state of the bonus-award feature 70 as shown in FIGS. 5 and 6, may be awarded to the player as credits, free spins, multipliers, extra wilds, bonuses and other prizes. For example, as shown in FIG. 6, the player is awarded 400 credits for the moving assets 86 that have fallen off of the shelf or ledge 76 and onto the reels 54*a-e*.

The certain game-play criteria that triggers the change of the state of the bonus-award feature 70 may include various factors, such as the outcome of the basic wagering game, including achieving special symbols or winning combinations on reels 54*a-e*. For example, as discussed above and shown in FIGS. 5 and 6, a special symbol 80 of a sailing boat or a combination 82 of three or more grapevines on a payline may trigger a modification of the state of the bonus-award feature 70. Other criteria may include a threshold level of assets 72 on the ledge or shelf 76, a certain amount of time that has passed since the last award, a certain amount of time that a player has been playing at the gaming machine 10, a certain amount of wager inputs by the player, etc. Such criteria may subsequently cause the state of the bonus-award feature 70 to be updated to award a prize.

In some embodiments, the primary display area 14 includes a moving object 90, such as an arrow, that moves along the edge of the shelf or ledge 76. The moving object 90 may indicate which portion of assets 72 will move forward towards the edge of the shelf of ledge 76 and/or fall off of the shelf or ledge 76. For example, in FIG. 4, the moving object 90 is located at the upper right-hand corner of the primary display area 14 and points to a portion of the assets 72 indicating a first state of the bonus-award feature 70. In FIG. 5, the assets 72 in the upper right-hand corner have moved forward from their positions on the shelf or ledge 76 in FIG. 4 to indicate a second state of the bonus-award feature 70 as the moving object 90 moves towards the center of the primary display area 14. In FIG. 6, the moving object 90 has moved nearer to the center of the primary display area 14 and a different portion of the assets 72 have moved forward on the shelf or ledge 76 indicating a third state of the bonus-award feature 70. A portion of these assets 72 have fallen from the shelf or ledge 76 and are awarded to the player as credits, free spins, and the like. It is contemplated that the moving object 90 may take other forms in addition to an arrow to indicate certain portions of the assets 72 that may change in accordance with the bonus-award feature 70 described herein.

It is also contemplated that the changing state of the bonus-award feature 70 is constant such that the assets 72 are continually moving from one location to another location on the transmissive display 56. For example, in addition to the movement of the assets 72 which has been described herein as moving from the reels 54*a-e* to the shelf or ledge of 76 of the bonus-award feature 70 and vice versa, the movement of the assets 72 may also occur in a horizontal or lateral direction. For example, as assets 72, i.e., coins, are transferred from one of the reels, i.e., 54*d*, to the shelf or ledge 76, the assets 72 begin to accumulate above the reel 54*d*. As more assets 72 occur on reel 54*d* and are subsequently transferred to the shelf or ledge 76 directly above the reel 54*d*, the assets 72 in that area may move laterally to the left and/or right. This side movement may cause other assets 72 on the shelf or ledge 76 to move in a lateral direction and/or cause them to fall from the shelf or ledge 76. Thus, the upward movement of assets 72 from the reels 54 to the shelf or ledge 76 may cause assets 72 on the shelf or ledge 76 to move to different locations on the primary display area 14.

In some embodiments, the bonus-award feature 70 may be triggered by an additional wager input by the player, outcomes at the gaming machine 10, periods of time since the last award feature was triggered, etc. Alternatively, the bonus-award feature 70 may be triggered entirely randomly and may not require any additional input from the player. Additionally, the bonus-award feature 70 may be associated with a base wagering game (as a base-award feature), a community game (as a community-award feature), a progressive game (as a progressive-award feature) and other types of wagering games.

Moreover, as mentioned above, in some embodiments, the bonus-award feature 70 may be displayed on the transmissive display 56 after the base wagering game ends and a bonus round begins. For example, during play of the base wagering game, a player may be awarded ten free spins of a base or bonus game. At that point, the bonus-award feature 70 appears on the transmissive display 56. At the end of the ten free spins, the bonus-award feature 70 is removed from the transmissive display 56 and the player returns to play of the base wagering game on the primary display area 14 (which does not include the bonus-award feature 70).

Each of these embodiments and obvious variations thereof is contemplated as falling within the spirit and scope of the claimed invention, which is set forth in the following claims.

What is claimed is:

1. A gaming system configured to play a casino wagering game including a changing-state bonus feature, the gaming system comprising:

at least one electronic input device configured to detect a physical item associated with a monetary amount that establishes a credit balance;

at least one electronic display device; and one or more controllers configured to:

initiate a play of the casino wagering game in response to an input indicative of a wager covered by the credit balance;

select an outcome of the play of the casino wagering game from a plurality of game outcomes, the plurality of game outcomes including a first outcome that changes a state of the changing-state bonus feature by adding one or more special symbols to an accumulation of special symbols, and a second outcome that changes the state of the changing-state bonus feature by subtracting one or more special symbols from the accumulation;

direct the at least one electronic display device to display, on an array of symbol-bearing reels, a symbol combination representing the selected outcome overlaid by a video image of the accumulation;

in response to the selected outcome being the first outcome, update the state of the changing-state bonus feature and, in response to the updated state meeting certain criteria, automatically provide a bonus award to a player and direct the at least one electronic display device to display, concurrently with the symbol combination on the array of symbol-bearing reels, a corresponding depiction of adding the one or more special symbols to the accumulation; and in response to the selected outcome being the second outcome, update the state of the changing-state bonus feature and, in response to the updated state meeting certain criteria, automatically provide a bonus award to a player and direct the at least one electronic display device to display, concurrently with the symbol combination on the array of symbol-bearing reels, a corresponding depiction of subtracting the one or more special symbols from the accumulation.

2. The gaming system of claim 1, wherein adding the special symbols to the accumulation causes one or more special symbols to be subtracted from the accumulation, wherein each of the addition and subtraction is depicted concurrently with the symbol combination on the symbol-bearing reels.

3. The gaming system of claim 1, wherein subtracting the one or more special symbols from the accumulation causes the player to receive an award, and wherein the gaming system further comprises a payoff device for dispensing monetary value from the credit balance.

4. The gaming system of claim 2, wherein subtracting the one or more special symbols from the accumulation causes the player to receive an award.

5. The gaming system of claim 1, wherein the corresponding depiction of adding is displayed as one or more special symbols moving from a first location to a second location, and the corresponding depiction of subtracting is displayed as one or more symbols moving from the second location to a third location.

6. The gaming system of claim 5, wherein the first location includes one or more of the symbol-bearing reels.

7. The gaming system of claim 1, wherein the array of symbol-bearing reels includes a plurality of mechanical symbol-bearing reels.

8. The gaming system of claim 1, wherein the at least one electronic display device includes a transmissive display device, the video image being displayed on the transmissive display device.

9. The gaming system of claim 1, wherein the outcome changing the state of the changing-state bonus feature is enabled by an additional wager.

10. The gaming system of claim 1, wherein adding to the accumulation advances the state of the changing-bonus features towards a threshold that triggers an award.

11. The gaming system of claim 10, wherein the gaming system does not disclose a proximity of the state to the threshold.

12. The gaming system of claim 1, wherein the video image includes a movable object that indicates a portion of the accumulation from which the one or more special symbols will be subtracted or to which the one or more special symbols will be added.

13. The gaming system of claim 1, wherein the outcome changing the state of the changing-state bonus feature includes displaying one or more of the special symbols in the symbol combination.

14. The gaming system of claim 1, wherein the state of the changing-state bonus feature, after the response to the outcome, persists through one or more subsequent outcomes until an occurrence of another outcome that changes the state of the changing-state bonus feature or until a player cashes out.

15. A method of operating a gaming system configured to play a casino wagering game, the gaming system including one or more controllers, an electronic input device configured to detect a physical item associated with a monetary amount that establishes a credit balance, and at least one electronic display device, the method comprising:

initiating a play of the wagering game in response to an input indicative of a wager covered by the credit balance;

selecting, by the one or more controllers, an outcome from a plurality of outcomes, the plurality of outcomes including a first outcome that changes a state of a changing-state bonus feature by adding one or more special symbols to the accumulation, and a second outcome that changes the state of the changing-state bonus feature by subtracting one or more special symbols from the accumulation;

displaying, on an array of symbol-bearing reels, a symbol combination representing the selected outcome overlaid by a video image of the accumulation;

in response to the selected outcome being the first outcome, updating the state of the changing-state bonus feature and, in response to the updated state meeting certain criteria, automatically providing an award to a player and displaying, concurrently with the symbol combination on the array of symbol-bearing reels, a corresponding depiction of adding the one or more special symbols to the accumulation; and in response to the selected outcome being the second outcome, updating the state of the changing-state bonus feature and, in response to the updated state meeting certain criteria, automatically providing an award to a player and displaying, concurrently with the symbol combination on the array of symbol-bearing reels, a corresponding depiction of subtracting the one or more special symbols from the accumulation.

16. The method of claim 15, wherein adding the one or more special symbols to the accumulation causes one or more special symbols to be subtracted from the accumulation, and wherein each of the addition and the subtraction are depicted concurrently with the symbol combination on the symbol-bearing reels.

17. The method of claim 15, wherein subtracting the one or more special symbols from the accumulation causes the player to receive an award.

18. The method of claim 15, wherein adding the special symbols to the accumulation causes one or more special symbols to be subtracted from the accumulation, and wherein subtracting the one or more special symbols from the accumulation causes a player to receive an award.

19. The method of claim 15, wherein the corresponding depiction of adding is displayed as one or more special symbols moving from a first location to an second location, and the corresponding depiction of subtracting is displayed as one or more special symbols moving from the second location to a third location.

20. The method of claim 19, wherein the first location includes one or more of the symbol-bearing reels.

21. The method of claim 15, wherein the at least one electronic display device includes a plurality of mechanical symbol-bearing reels.

22. The method of claim 15, wherein the at least one electronic display device includes a transmissive display device, the video image being displayed on the transmissive display device.

23. A casino gaming machine configured to play at least one casino wagering game, the gaming machine comprising:

an electronic display device;

an electronic input device configured to detect a physical item associated with a monetary amount that establishes a credit balance; and one or more controllers configured to:

initiate a play of the casino wagering game in response to an input indicative of a wager covered by the credit balance;

select an outcome of the casino wagering game from a plurality of game outcomes, the plurality of game outcomes including a first outcome that changes a state of a changing-state bonus feature by adding one or more special symbols to an accumulation of special symbols, and a second outcome that changes the state of the changing-state bonus feature by subtracting one or more special symbols from the accumulation;

direct the electronic display device to display a symbol combination representing the selected outcome overlaid by a video image of the accumulation;

in response to the selected outcome being the first outcome, update the state of the changing-state bonus feature and, in response to the updated state meeting certain criteria, automatically provide a bonus award to a player; and in response to the selected outcome being the second outcome, update the state of the changing-state bonus feature and, in response to the updated state meeting certain criteria, automatically provide a bonus award to a player.

24. The gaming machine of claim 23, wherein adding the one or more special symbols to the accumulation causes one or more special symbols to be subtracted from the accumulation.

25. The gaming machine of claim 23, wherein subtracting the one or more special symbols from the accumulation causes the player to receive an award.

26. The gaming machine of claim 24, wherein subtracting the one or more special symbols from the accumulation causes the player to receive an award.

27. The gaming machine of claim 23, wherein the corresponding depiction of adding is displayed as one or more special symbols moving from a first location to an second location, and the corresponding depiction of subtracting is displayed as one or more symbols moving from the second location to a third location.

28. The gaming machine of claim 23, wherein the first location includes one or more of the symbol-bearing reels.

29. The gaming machine of claim 23, wherein the electronic display device includes a plurality of mechanical symbol-bearing reels.

30. The gaming machine of claim 23, wherein the electronic display device includes a transmissive display device, the video image being displayed on the transmissive display device.

* * * * *